United States Patent
Choi et al.

(10) Patent No.: US 11,972,185 B2
(45) Date of Patent: Apr. 30, 2024

(54) METHOD AND APPARATUS FOR ESTIMATING AGING OF INTEGRATED CIRCUIT

(71) Applicant: Samsung Electronics Co., Ltd., Suwon-si (KR)

(72) Inventors: Jaehee Choi, Seoul (KR); Udit Monga, Hwaseong-si (KR); Ken Machida, Kanagawa (JP); Uihui Kwon, Hwaseong-si (KR); Yonghee Park, Hwaseong-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 972 days.

(21) Appl. No.: 16/919,157

(22) Filed: Jul. 2, 2020

(65) Prior Publication Data
US 2021/0165940 A1 Jun. 3, 2021

(30) Foreign Application Priority Data
Nov. 28, 2019 (KR) ........................ 10-2019-0156117

(51) Int. Cl.
*G06F 30/3308* (2020.01)
*G06F 119/04* (2020.01)

(52) U.S. Cl.
CPC ...... *G06F 30/3308* (2020.01); *G06F 2119/04* (2020.01)

(58) Field of Classification Search
CPC .......................... G06F 30/3308; G06F 2119/04
USPC ........................................................ 703/14
See application file for complete search history.

(56) References Cited

U.S. PATENT DOCUMENTS

| | | |
|---|---|---|
| 7,292,968 B2 | 11/2007 | Wu et al. |
| 8,099,269 B2 | 1/2012 | Topaloglu et al. |
| 8,479,130 B1 | 7/2013 | Zhang et al. |
| 8,650,527 B2 | 2/2014 | Oliva et al. |
| 9,141,735 B2 | 9/2015 | Lo et al. |
| 10,216,879 B1 | 2/2019 | Huang et al. |

(Continued)

FOREIGN PATENT DOCUMENTS

JP 4989261 B2 8/2012

OTHER PUBLICATIONS

Schlünder, Christian, et al. "From device aging physics to automated circuit reliability sign off." 2019 IEEE International Reliability Physics Symposium (Irps). IEEE, 2019. pp. 1-12. (Year: 2019).*

(Continued)

*Primary Examiner* — John E Johansen
(74) *Attorney, Agent, or Firm* — Muir Patent Law, PLLC

(57) ABSTRACT

A method of estimating aging of an integrated circuit (IC) includes: obtaining a first process design kit (PDK) including a plurality of first device models corresponding to a plurality of devices provided by a process of fabricating the IC; obtaining values of aging parameters of device instances included in a netlist defining the IC, by performing a first circuit simulation based on the netlist and the first PDK; and obtaining aging data of the IC by performing a second circuit simulation based on the values of the aging parameters and the netlist, wherein each of the plurality of first device models includes at least one measurement command to be executed in the first circuit simulation to calculate an aging parameter.

20 Claims, 17 Drawing Sheets

(56) References Cited

U.S. PATENT DOCUMENTS

2012/0123745 A1 5/2012 Sheu et al.
2015/0234961 A1 8/2015 Zhang et al.
2017/0103154 A1 4/2017 Jeon et al.

OTHER PUBLICATIONS

Mintarno, Evelyn, et al. "Workload dependent NBTI and PBTI analysis for a sub-45nm commercial microprocessor." 2013 IEEE International Reliability Physics Symposium (IRPS). IEEE, 2013. pp. 1-6. (Year: 2013).*
Jeng, Min-Chie; Hsiao, Cheng; Su, Ke-Wei; Lin, Chung-Kai, "Circuit Reliability Simulation Using TMI2," Proceedings of the IEEE 2013 Custom Integrated Circuits Conference, 2013, San Jose, CA (7 pages).

* cited by examiner

FIG. 3

```
                                                                    PDK1'
L11   .lib nfet_a
L12   .subckt nfet d g s b
L13   + l=0 nfin=1 nf=1

.   ...
  .
  .

L21   main d g s b nfet l=l_calc nfin=nfin nf=nf
L22   + delvtrand=delvtrand_f u0mult=u0mult_f
L23   + ids0mult=ids_mult dtemp=dtemp

.   ...
  .
  .

L31   .meas tran aging1_nfet integ par('v(g,s)*v(d,s)')
L32   .meas tran aging2_nfet ...

.   ...
  .
  .

L41   .ends nfet
L42   .endl nfet_a
```

FIG. 4A

```
                                                              PDK1a
L11   .lib nfet_a
L12   .subckt nfet d g s b
L13   + l=0 nfin=1 nf=1
  .
  .   ...
  .

L21   main d g s b nfet l=l_calc nfin=nfin nf=nf
L22   + delvtrand=delvtrand_f u0mult=u0mult_f
L23   + ids0mult=ids_mult dtemp=dtemp
  .
  .   ...
  .
L31   .lib './agingpar.lib' aging_nfet
  .
  .   ...
  .
L41   .ends nfet
L42   .endl nfet_a
```

FIG. 4B

```
                                                              A_LIBa
L11   .lib aging_nfet
 .
 .    ...
 .
L21   .meas tran aging1_nfet integ par('v(g,s)*v(d,s)')
L22   .meas tran aging2_nfet ...
 .
 .    ...
 .
L31   .endl
```

FIG. 5A

```
                                                        PDK1b
L11   .lib nfet_a
L12   .subckt nfet d g s b
L13   + l=0 nfin=1 nf=1
  .
  .   ...
  .
L21   main d g s b nfet l=l_calc nfin=nfin nf=nf
L22   + delvtrand=delvtrand_f u0mult=u0mult_f
L23   + ids0mult=ids_mult dtemp=dtemp
  .
  .   ...
  .
L31   .lib './setvar.lib' set_nfet
L32   .lib './agingpar.lib' aging_nfet
  .
  .   ...
  .
L41   .ends nfet
L42   .endl nfet_a
```

FIG. 5B

```
       S_LIB
L11  .lib set_nfet
L12  .param dg1 = 1
L13  + dg2 = 1
 .   ...
 .
 .
L21  .endl nfet_a
```

FIG. 5C

```
                                                                    A_LIBb
L11    .lib aging_nfet
 .
 .     ...
 .
L21    .meas tran aging1_nfet integ par('dg1*v(g,s)*v(d,s)')
L22    .meas tran aging2_nfet ...
 .
 .     ...
 .
L31    .endl
```

FIG. 6

A_LIBc

| L11 | .lib aging_nfet |
| ... | ... |
| L21 | .meas tran vdavg avg v(d) |
| L22 | .meas tran aging1_nfet integ par('dg1*v(g,s)*v(d,s)') |
| L23 | .meas tran aging2_nfet param = 'dg2*vdavg' |
| ... | ... |
| L31 | .endl |

FIG. 8

```
         ...                                      A_PAR'
    ⋮    ...
    L21  xinv1.xfet_01.aging1_nfet=0.01
    L22  xinv1.xfet_01.aging2_nfet=0.21
    ⋮    ...
```

FIG. 11

```
L11   .defparam xinv1.xfet_01.ids0mult=0.90
L12   + xinv1.xfet_01.delvtrand=-0.02
L13   + xinv1.xfet_01.dtemp= 9.0
 .    ...
 .
 .
```
PDK3

METHOD AND APPARATUS FOR ESTIMATING AGING OF INTEGRATED CIRCUIT

CROSS-REFERENCE TO RELATED APPLICATION

This application claims the benefit of priority under 35 U.S.C. § 119 to Korean Patent Application No. 10-2019-0156117, filed on Nov. 28, 2019, in the Korean Intellectual Property Office, the disclosure of which is incorporated herein in its entirety by reference.

BACKGROUND

The inventive concept relates to an integrated circuit (IC) and, more particularly, to a method and apparatus for estimating aging of an IC.

ICs fabricated by a semiconductor process may be demanded to have high reliability. For example, ICs may be included in not only home appliances but also transportation means, communication devices, medical devices, and the like, and an IC having low reliability may cause a significant problem. Devices included in an IC may be degraded over time due to various causes, and aging of the IC may decrease the reliability of the IC. Accordingly, to fabricate ICs having desired reliability, it may be significant to accurately estimate aging of an IC in a process of designing the IC. In addition, efficiently estimating aging of an IC may reduce a re-design time of an IC having improved reliability, thereby resulting in reducing a time-to-market (TTM) of an IC.

SUMMARY

The inventive concept provides a method and system for accurately and efficiently estimating aging of an integrated circuit, and a computer-readable non-transitory storage medium.

According to an embodiment of the inventive concept, there is provided a system for estimating aging of an integrated circuit (IC), the system including: at least one processor; and a computer-readable non-transitory storage medium which stores instructions executable by the at least one processor, wherein the at least one processor is configured to access the computer-readable non-transitory storage medium and, when executing the instructions, to perform operations comprising: obtaining a first process design kit (PDK) including a plurality of first device models corresponding to a plurality of devices provided by a process of fabricating the IC; obtaining values of aging parameters of device instances included in a netlist defining the IC, by performing a first circuit simulation based on the netlist and the first PDK; and obtaining aging data of the IC by performing a second circuit simulation based on the values of the aging parameters and the netlist, wherein each of the plurality of first device models includes at least one measurement command to be executed in the first circuit simulation to calculate an aging parameter.

According to another embodiment of the inventive concept, there is provided a method of estimating aging of an integrated circuit (IC), the method including: obtaining a first process design kit (PDK) including a plurality of first device models corresponding to a plurality of devices provided by a process of fabricating the IC; and obtaining values of aging parameters of device instances included in a netlist defining the IC, by performing a first circuit simulation based on the netlist and the first PDK, wherein the obtaining of the first PDK includes: obtaining a second PDK including a plurality of second device models including model parameters defining operational characteristics of the plurality of devices, respectively; obtaining an aging library including a plurality of measurement commands, which are to be executed in the first circuit simulation and correspond to the plurality of devices, to calculate the aging parameters; and generating the first PDK by adding at least one measurement command to each of the plurality of second device models based on the second PDK and the aging library.

According to another embodiment of the inventive concept, there is provided a computer-readable non-transitory storage medium storing therein computer-executable instructions to estimate aging of an integrated circuit (IC), wherein an operation performed by a computer executing instructions includes: obtaining a first process design kit (PDK) including a plurality of first device models corresponding to a plurality of devices provided by a process of fabricating the IC; obtaining values of aging parameters of device instances included in a netlist defining the IC, by performing a first circuit simulation based on the netlist and the first PDK; and obtaining aging data of the IC by performing a second circuit simulation based on the values of the aging parameters and the netlist, wherein each of the plurality of first device models includes at least one measurement command to be executed in the first circuit simulation to calculate an aging parameter.

BRIEF DESCRIPTION OF THE DRAWINGS

Embodiments of the inventive concept will be more clearly understood from the following detailed description taken in conjunction with the accompanying drawings in which like numbers refer to like elements throughout. In the drawings:

FIG. 3 illustrates an example of an aging process design kit (PDK), according to an example embodiment of the inventive concept;

FIG. 4A illustrates an example of an aging PDK, according to an example embodiment of the inventive concept;

FIG. 4B illustrates an example of an aging library, according to an example embodiment of the inventive concept;

FIG. 5A illustrates an example of an aging PDK, according to an example embodiment of the inventive concept;

FIG. 5B illustrates a variable configuration library, according to an example embodiment of the inventive concept;

FIG. 5C illustrates an aging library, according to an example embodiment of the inventive concept;

FIG. 6 illustrates an aging library, according to an example embodiment of the inventive concept;

FIG. 8 illustrates instances of aging parameters, according to an example embodiment of the inventive concept;

FIG. 11 illustrates an example of an aged PDK, according to an example embodiment of the inventive concept;

DETAILED DESCRIPTION OF THE EMBODIMENTS

Figure 1:
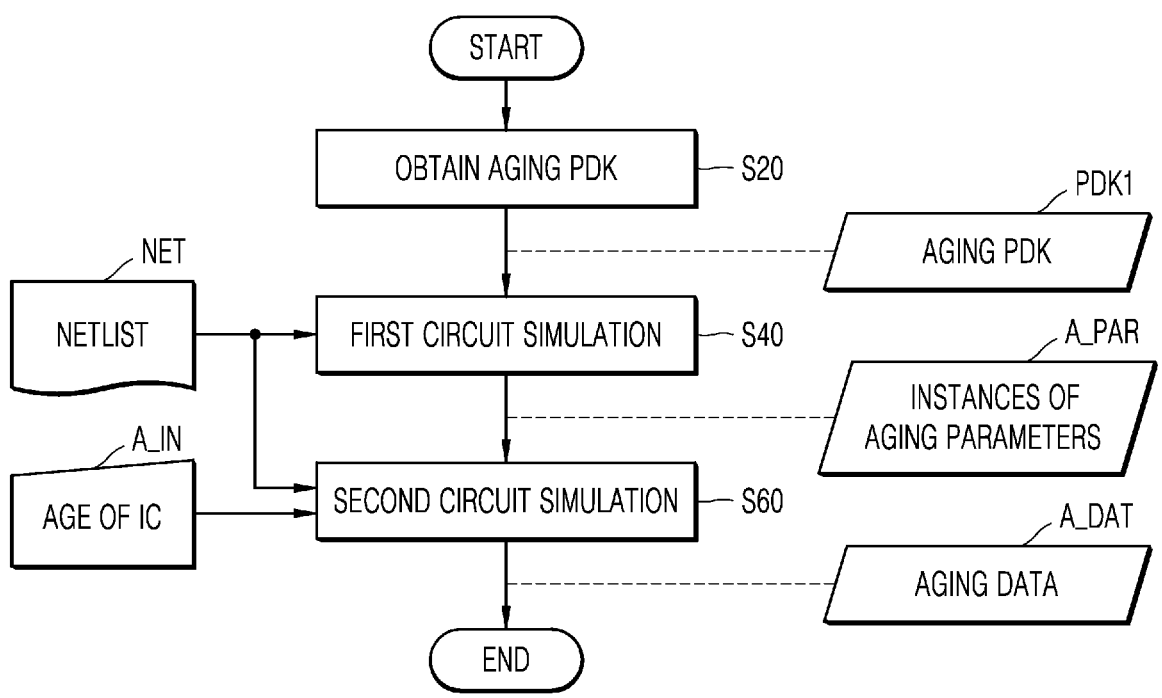
FIG. 1 is a flowchart of a method of estimating aging of an integrated circuit (IC), according to an example embodiment of the inventive concept.

FIG. 1 is a flowchart of a method of estimating aging of an integrated circuit (IC), according to an example embodiment of the inventive concept. As shown in FIG. 1, the method of estimating aging of an IC may include operations S20, S40, and S60. The method of estimating aging of an IC may be performed by various ways, and according to some embodiments, the method of estimating aging of an IC may be performed by a computing system, such as the computing system shown in FIG. 13. In addition, according to some embodiments, as described below with reference to FIG. 7 and the like, the method of estimating aging of an IC may be performed by an aging analyzer or by both the aging analyzer and a circuit simulator.

An IC may include a plurality of devices fabricated by a semiconductor process, and the devices included in the IC may be degraded over time due to various causes. For example, devices included in the IC may include, for example, a transistor, a capacitor, a resistor, and the like. For example, a threshold voltage, a drain current, and the like among the characteristics of a transistor may be degraded over time due to various aging phenomena, e.g., bias temperature instability (BTI), hot carrier injection (HCI), time dependent dielectric breakdown (TDDB), self-heating, and the like. Such aging of an IC may reduce the performance of the IC and cause a malfunction. Accordingly, to fabricate an IC having high reliability, it may be significant that the lifespan of the IC, i.e., a period of time for which the IC is able to provide desirable performance despite aging of the IC, is accurately predicted in a design step of the IC.

Sign-off is a final step of an IC design and may include operations of verifying a designed IC by various manners, and when the verification of the IC is finished (i.e., when sign-off is successfully finished), operations of fabricating an IC may be performed. Sign-off may include an operation of verifying whether the lifespan of an IC satisfies a demanded criterion, and to estimate the lifespan of the IC, aging of the IC may be estimated. Aging of an IC may demand not only high accuracy, as described above, but also high efficiency. For example, estimating aging of an IC having high complexity, such as a system on chip (SoC), may demand high computing power, and accordingly, efficiently estimating aging of an IC may reduce a time taken for sign-off and reduce a re-design time of the IC, thereby significantly reducing a time-to-market (TTM) of the IC.

As described below with reference to the drawings, according to a method and apparatus for estimating aging of an IC, according to example embodiments of the inventive concept, flattening of a netlist defining the IC may be omitted. Accordingly, errors, which may occur in a process of using a flattened netlist, may be removed, and time and resources (e.g., a storage space, a bandwidth, and the like) required to estimate aging of the IC may be significantly reduced. In addition, based on reduced dependency on a circuit simulator, aging estimation of an IC, which is possible even in various circuit simulators, may be achieved.

Referring to FIG. 1, in operation S20, an aging process design (or development) kit (PDK) PDK1 may be obtained. A PDK may indicate data for modeling a process of fabricating an IC. For example, the PDK may include a plurality of device models (also referred to as a plurality of second device models herein) corresponding to a plurality of devices provided by a process. Each of the plurality of device models may include a plurality of model parameters indicating operational characteristics of the devices. The PDK may be provided by a semiconductor fabrication plant (or fabrication (FAB) or foundry), and a designer of an IC may design the IC by using the PDK to verify an IC design. Herein, the PDK may indicate data in which information related to aging (e.g., an aging parameter) is omitted and may distinguished from an aging PDK and aged PDK described below, and herein, the PDK may be referred to as a second PDK.

The aging PDK PDK1 may include information included in the PDK and information for estimating aging of the IC. For example, as described below with reference to FIG. 3, the aging PDK PDK1 may include a function defining an aging parameter, i.e., an aging function, and include a measurement command for directing a circuit simulator to measure a result of the aging function. The aging PDK PDK1 may define a plurality of aging parameters respectively corresponding to a plurality of devices provided by a process, or a plurality of aging parameters may be defined to estimate aging of a single device. In addition, as described below with reference to FIG. 3 and the like, the aging function and the measurement command may exist inside a device model, and accordingly, flattening of a netlist NET may be omitted in a process of estimating aging of the IC. The aging PDK PDK1 may include a plurality of device models (also referred to as a plurality of first device models herein), each including at least one measurement command, and herein, the aging PDK PDK1 may be referred to as a first PDK. An example of operation S20 may be described with reference to FIG. 2.

In operation S40, a first circuit simulation may be performed. As shown in FIG. 1, the first circuit simulation may be performed based on the netlist NET defining the IC and the aging PDK PDK1. The netlist NET may include information about devices included in an IC and connections between the devices. The netlist NET and the aging PDK PDK1 may be provided to the circuit simulator, and the circuit simulator may simulate the IC defined by the netlist NET, with reference to the aging PDK PDK1. The circuit simulator is an analog electronic circuit simulator, may be referred to as a simulation program with integrated circuit emphasis (SPICE), and may include, as non-limiting examples, Synopsys's HSPICE and FineSim, Cadence's PSPICE and Spectre, and the like. Hereinafter, although the example embodiments of the inventive concept are described mainly with reference to HSPICE, the embodiments of the inventive concept are not limited thereto.

Aging of a device included in an IC may depend on electrical stress applied to the device. For example, as one of the aging phenomena, the HCI may be related to a change in mobility of electrons and/or holes and may worsen as a drain-source voltage Vds applied to a field effect transistor (FET) increases. In addition, as one of the aging phenomena, the BTI may cause a threshold voltage shift of a transistor and may worsen as an absolute value of a gate-source voltage Vgs applied to a FET increases. The HCI and the BTI described above may worsen as not only electrical stress but also a temperature of an IC increase. Accordingly, to estimate aging of a device, it may be demanded to analyze electrical stress (e.g., a voltage and/or a current), heat, and the like applied to devices included in an IC, and to this end, a circuit simulation based on the netlist NET may be performed.

The netlist NET defining the IC may include a plurality of sub-circuits hierarchically connected. A sub-circuit of the netlist NET may refer to a specific circuit, such as a subroutine or function of software, defined as an object having nodes connected to the outside and parameters defining characteristics. For example, a sub-circuit may start with ".subckt" and end with ".ends" in HSPICE and include contents defining the sub-circuit between ".subckt" and ".ends". A sub-circuit may quote another sub-circuit such as a function call of software, and the quoted sub-circuit may be implemented in a real IC as a portion of a quoting sub-circuit. The netlist NET may include a self-defined sub-circuit or quote sub-circuits provided by the PDK. For example, the plurality of device models included in the PDK may be defined as a plurality of sub-circuits, respectively. Accordingly, the netlist NET may include the plurality of sub-circuits hierarchically connected, circuits included in the netlist NET by quoting sub-circuits that may be referred to as instances of the sub-circuits, and particularly, circuits included in the netlist NET by quoting device models defined by the PDK that may be referred to as device instances.

As described above, the aging PDK PDK1 generated in operation S20 may include a measurement command inside a device model, and accordingly, when the netlist NET quotes the device model, the measurement command included in the device model may be executed by the circuit simulator in operation S40. For example, as described below with reference to FIG. 3, a measurement command ".meas" included in a sub-circuit between ".subckt" and ".ends" may be executed by the circuit simulator while the first circuit simulation is being executed. Accordingly, in operation S40, electrical stress and/or heat applied to a device instance included in the netlist NET may be analyzed, and simultaneously, a value of an aging parameter of the device instance may be calculated by the aging function. For example, although a first device instance and a second instance included in the netlist NET correspond to the same device model, e.g., the same n-channel FET (NFET), a value of an aging parameter of the first device instance may differ from a value of an aging parameter of the second device instance because of different electrical stress and/or heat applied when an IC operates.

First simulation data obtained by performing the first circuit simulation may include values of aging parameters, and herein, the aging parameters included in the first simulation data and having the values may be referred to as instances of the aging parameters. Accordingly, as shown in FIG. 1, by performing operation S40, instances A_PAR of aging parameters may be obtained, and herein, operation S40 may be referred to as an operation of obtaining the instances A_PAR of aging parameters or values of aging parameters. An example of operation S40 may be described below with reference to FIG. 7.

In operation S60, a second circuit simulation may be performed. As shown in FIG. 1, the second circuit simulation may be performed based on the netlist NET defining the IC, an age A_IN of the IC, and the instances A_PAR of aging parameters. The age A_IN of the IC may indicate an age of an IC to be tested by a user, e.g., a designer of the IC or a verifier of a design of the IC. For example, the user may input "2 years" as the age A_IN of the IC to verify the performance of the IC after two years and check whether degradation of the performance of the IC is at an appropriate level with reference to a result of the second circuit simulation (also referred to as second simulation data or aging data).

According to some embodiments, the instances A_PAR of aging parameters obtained in operation S40 may indicate an aging degree for a unit period of time. For example, threshold voltage shift, drain current reduction, and the like may occur in an FET due to aging phenomena, and aged parameters (or values of aging parameters) of an FET instance may indicate threshold voltage shift for the unit period of time and drain current reduction for the unit period of time, respectively. Accordingly, aging of the FET instance may be determined according to the age A_IN of the IC, which is input by the user, and the IC including the aged FET instance may be simulated in operation S60. As shown in FIG. 1, aging data DAT may be generated by performing the second circuit simulation, and herein, operation S60 may be referred to as an operation of obtaining the aging data A_DAT. The aging data A_DAT may include information indicating an operation of the IC aged according to the age A_IN of the IC and may be used to evaluate the reliability of the IC. An example of operation S60 will be described below with reference to FIG. 9.

Unlike that shown in FIG. 1, to analyze electrical stress and heat applied to each of the device instances included in the netlist NET, a scheme of flattening the netlist NET and performing a circuit simulation based on the flattened netlist may be considered. Flattening may indicate an operation of removing a hierarchy of sub-circuits in the netlist NET, and accordingly, in the flattened netlist, instead of quoting a sub-circuit, the contents of a sub-circuit quoted in the netlist NET may be included in the flattened netlist after being modified to meet an instance of the sub-circuit. However, along with an increase in the complexity of an IC, a hierarchical structure of the netlist NET may also have a high complexity and height, and accordingly, a massive storage space may be demanded for a flattened netlist, and in a process of generating, storing, and processing a flattened netlist, many errors may occur and a long time may be taken. In addition, aging of each of device instances, i.e., aging parameters, is needed to be individually calculated based on electrical stress obtained by using a flattened netlist, and a new flattened netlist, on which the calculated aging parameters are reflected, may be generated, thereby causing many errors and much time consumption.

As described above with reference to FIG. 1, the aging PDK PDK1 may be independently generated in the netlist NET defining the IC, and values of aging parameters on which electrical stress is reflected, i.e., the instances A_PAR of aging parameters, may be obtained through the first circuit simulation. Accordingly, flattening of the netlist NET may be omitted, and the problems described above due to flattening of the netlist NET may be removed. In addition, as described below with reference to FIG. 9, the instances A_PAR of aging parameters may be simply applied to a simulation of an aged IC, i.e., the second circuit simulation. As a result, the estimation of aging of an IC according to an example embodiment of the inventive concept may provide both improved accuracy and efficiency because of low complexity.

Figure 2:
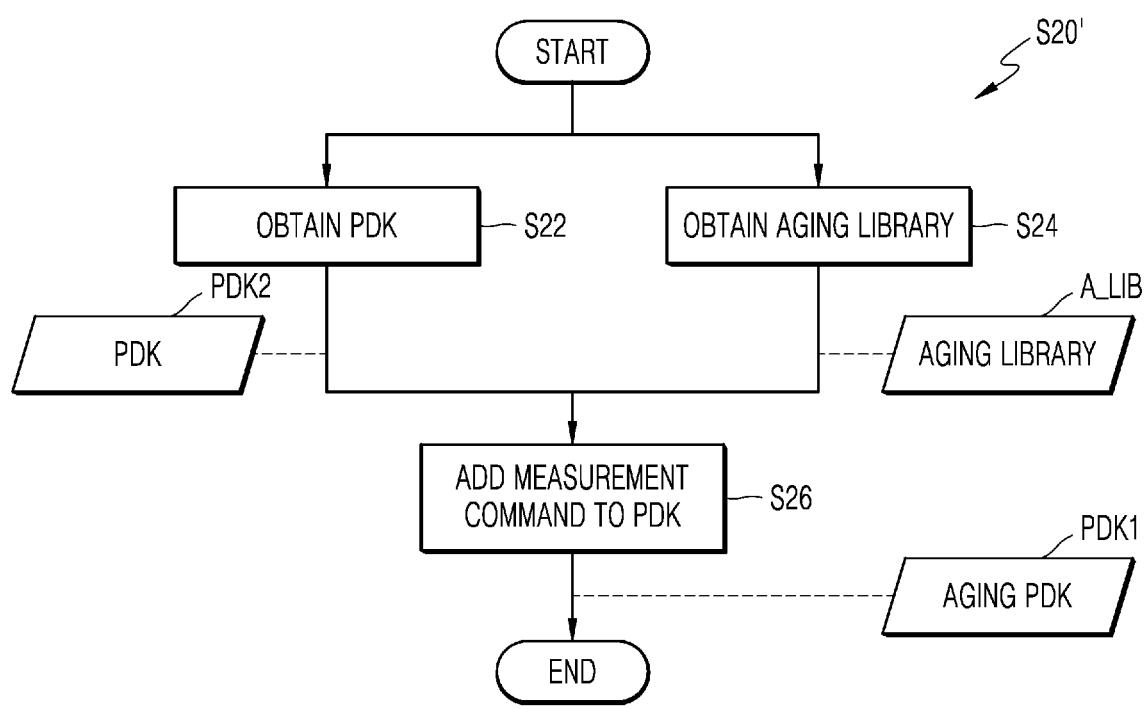
FIG. 2 is a flowchart of a method of estimating aging of an IC, according to an example embodiment of the inventive concept.

FIG. 2 is a flowchart of a method of estimating aging of an IC, according to an example embodiment of the inventive concept. Particularly, the flowchart of FIG. 2 is an example of operation S20 of FIG. 1. As described above with reference to FIG. 1, in operation S20' of FIG. 2, an operation of obtaining the aging PDK PDK1 may be performed, and as shown in FIG. 2, operation S20' may include operations S22, S24, and S26. Hereinafter, FIG. 2 will be described with reference to FIG. 1.

In operation S22, a PDK PDK2 may be obtained. As described above with reference to FIG. 1, the PDK PDK2 may include a plurality of device models (or the plurality of first device models) and may be provided from a semiconductor fabrication plant. According to some embodiments, the PDK PDK2 may be obtained by being loaded from a storage medium in which the PDK PDK2 is stored.

In operation S24, an aging library A_LIB may be obtained. The aging library A_LIB may include information indicating aging characteristics of a plurality of devices provided by a process of fabricating an IC. For example, the aging library A_LIB may define an aging parameter of a device, an aging function for calculating the aging parameter, and arguments required to calculate the aging function. The aging library A_LIB may have an arbitrary format, and according to some embodiments, the aging library A_LIB may be created according to an input format of a circuit simulator. Examples of the aging library A_LIB will be described below with reference to FIGS. 4B and 5C.

According to some embodiments, the aging library A_LIB may include an aging function including a continuous function. For example, a continuous function supportable by a plurality of different circuit simulators may be defined, and an aging parameter may be defined using the continuous function. Accordingly, the aging PDK PDK1 may be used regardless of a type of a circuit simulator.

In operation S26, the aging PDK PDK1 may be generated by adding a measurement command to the PDK PDK2. According to some embodiments, an aging parameter, an aging function, and arguments corresponding to a device model included in the PDK PDK2 may be retrieved from the aging library A_LIB, and a measurement command for measuring or calculating the retrieved information may be added to the inside of the device model. According to some embodiments, the measurement command may be directly added to the PDK PDK2. According to some embodiments, the measurement command may be indirectly added by adding, to the PDK PDK2, a path indicating a part corresponding to the device model in the aging library A_LIB. In addition, according to some embodiments, the aging function may include a process dependent variable to reflect process adjustment, and a part of configuring the process dependent variable may be added before the measurement command.

FIG. 3 illustrates an example of an aging PDK, according to an example embodiment of the inventive concept. Particularly, FIG. 3 illustrates a single device model included in an aging PDK PDK1'. As described above with reference to FIG. 2, the aging PDK PDK1' may be generated by adding a measurement command to the PDK PDK2, and the aging PDK PDK1' may include a directly added measurement command.

Referring to FIG. 3, the aging PDK. PDK1' may include an NFET model defined in lines L11 to L42 as a device model, and model parameters defining the characteristics of an NFET may be set in lines L21 to L23. For example, the NFET may include "delvtrand", "u0mult", "ids0mult", "dtemp", and the like as model parameters provided by a Berkeley short-channel IGFET model (BSIM). Herein, "delvtrand" may indicate threshold voltage shift, "u0mult" may indicate a multiplier for mobility, "ids0mult" may indicate a multiplier for a source-drain channel current, and "dtemp" may indicate device temperature shift. As described below with reference to FIGS. 10 and 11, at least one of the model parameters described above may be set as an aged value in a device instance, and accordingly, an aged IC may be simulated (i.e., the second circuit simulation).

The aging PDK PDK1' may include added measurement commands, i.e., ".meas", in lines L31 and L32. Referring to line L31, a first aging parameter "aging1_nfet" of the NFET may be defined as an integral value of a product of a gate-source voltage "v(g,s)" and a drain-source voltage "v(d,s)", and the measurement command ".meas" may direct a circuit simulator to calculate (or measure) the first aging parameter "aging1_nfet" during the first circuit simulation. Likewise, a second aging parameter "aging2_nfet" of the NFET may be defined in line L32, and the measurement command ".meas" may direct the circuit simulator to calculate (or measure) the second aging parameter "aging2_nfet" during the first circuit simulation.

FIG. 4A illustrates an example of an aging PDK according to an example embodiment of the inventive concept, and FIG. 4B illustrates an example of an aging library according to an example embodiment of the inventive concept. Particularly, FIG. 4A illustrates an aging PDK PDK1a to which a measurement command is indirectly added, and FIG. 4B illustrates an aging library A_LIBa including the indirectly added measurement command. Hereinafter, the description made with reference to FIG. 3 will be omitted in the description with reference to FIGS. 4A and 4B.

Referring to FIG. 4A, the aging PDK PDK1a may include an NFET model defined in lines L11 to L42 as a device model. In addition, the aging PDK PDK1a may include, in line L31, a path indicating a part corresponding to the NFET model in the aging library A_LIBa of FIG. 4B. For example, a file name of the aging library A_LIBa of FIG. 4B may be "agingpar.lib", and "./agingpar.lib" in line L31 of FIG. 4A may indicate a path to access the aging library A_LIBa. In addition, "aging_nfet" in line L31 of FIG. 4A may be an index of the part corresponding to the NFET model in the aging library A_LIBa. For example, as shown in FIG. 4B, the aging library A_LIBa may include a part defined by the index "aging_nfet" in lines L11 to L31 and include measurement commands in lines L21 and L22. Accordingly, the measurement commands of FIG. 4B may be indirectly added in line L31 of FIG. 4A.

FIG. 5A illustrates an example of an aging PDK according to an example embodiment of the inventive concept, FIG. 5B illustrates a variable configuration library according to an example embodiment of the inventive concept, and FIG. 5C illustrates an aging library according to an example embodiment of the inventive concept. Particularly, FIG. 5A illustrates an aging PDK PDK1b in which a part at which a process dependent variable is configured is added before a measurement command, FIG. 5B illustrates a variable configuration library S_LIB in which the process dependent variable is configured, and FIG. 5C illustrates an aging library A_LIBb defining an aging parameter by using the process dependent variable. Hereinafter, the description made with reference to FIGS. 3, 4A, and 4B will be omitted in the description with reference to FIGS. 5A, 5B, and 5C.

Referring to FIG. 5A, the aging PDK PDK1*h* may include an NFET model defined in lines L11 to L42 as a device model and include a path indicating the aging library A_LIBb of FIG. 5C in line L32. In addition, the aging PDK PDK1*b* may include a path indicating the variable configuration library S_LIB in line L31. For example, a file name of the variable configuration library S_LIB of FIG. 5B may be "setvar.lib", and "setvar.lib" in line L31 of FIG. 5A may indicate a path to access the variable configuration library S_LIB. In addition, "set_nfet" in line L31 of FIG. 5A may be an index of a part corresponding to the NFET model in the variable configuration library S_LIB. For example, as shown in FIG. 5B, the variable configuration library S_LIB may include a part defined by the index "set_nfet" in lines L11 to L21 and configure process dependent variables "dg1" and "dg2" in lines L12 and L13.

A process of fabricating an IC may be adjusted for various purposes, and devices fabricated by the adjusted process may have modified characteristics. To consider these modified characteristics, an aging function may include a process dependent variable. For example, as shown in FIG. 5C, the aging library A_LIBb may include measurement commands, i.e., ".meas", in lines L21 and L22. Referring to line L21, a first aging parameter "aging1_nfet" of the NFET may be defined as an integral value of a value obtained by multiplying a process dependent variable "dg1" by a product of a gate-source voltage "v(g,s)" and a drain-source voltage "v(d.s)". Accordingly, defining the process dependent variable "dg1" may be demanded before calculating the first aging parameter "aging1_nfet", and as shown in FIG. 5A, before the aging library A_LIBb (i.e., before a measurement command), the variable configuration library S_LIB in which the process dependent variable "dg1" is configured may be added. Accordingly, when a process of fabricating an IC is adjusted, values of process dependent variables may be modified in the variable configuration library S_LIB, and an aging parameter indicating aging of a device provided by the adjusted process may be defined.

FIG. 6 illustrates an aging library, according to an example embodiment of the inventive concept. Particularly, as described above with reference to FIGS. 4A and 4B, an aging library A_LIBc of FIG. 6 may include an indirectly added measurement command and include a measurement command for measuring an argument of an aging function. Hereinafter, the description made with reference to FIGS. 3, 4B, and 5C will be omitted in the description with reference to FIG. 6.

Referring to FIG. 6, the aging library A_LIBc may include a part defined by an index "aging_nfet" in lines L11 to L31. In addition, an aging library A_LIBc may include measurement commands ".meas" in lines L21 to L23. A circuit simulator may limit a type of arguments to be used in a user-defined function coming next to a measurement command according to some embodiments, and limit the use of pre-defined functions coming next to a measurement command according to some embodiments. Accordingly, the aging library A_LIBc may include a measurement command for measuring some arguments of an aging function (also referred to as a first measurement command herein) before a measurement command defining the aging function (also referred to as a second measurement command herein). For example, as shown in FIG. 6, in line L21, a variable "vdavg" may be defined as an average of a drain voltage "v(d)", and a measurement command ".meas" may direct a circuit simulator to measure the variable "vdavg" during the first circuit simulation. In addition, in line L23, the second aging parameter "aging2_nfet" may be defined as a product of the process dependent variable "dg2" and the variable "vdavg", and a measurement command ".meas" may direct the circuit simulator to measure the second aging parameter "aging2_nfet" during the first circuit simulation. In addition, according to some embodiments, as described above with reference to FIG. 3, the first measurement command and the second measurement command may be directly added to the PDK PDK2 of FIG. 2.

Figure 7:
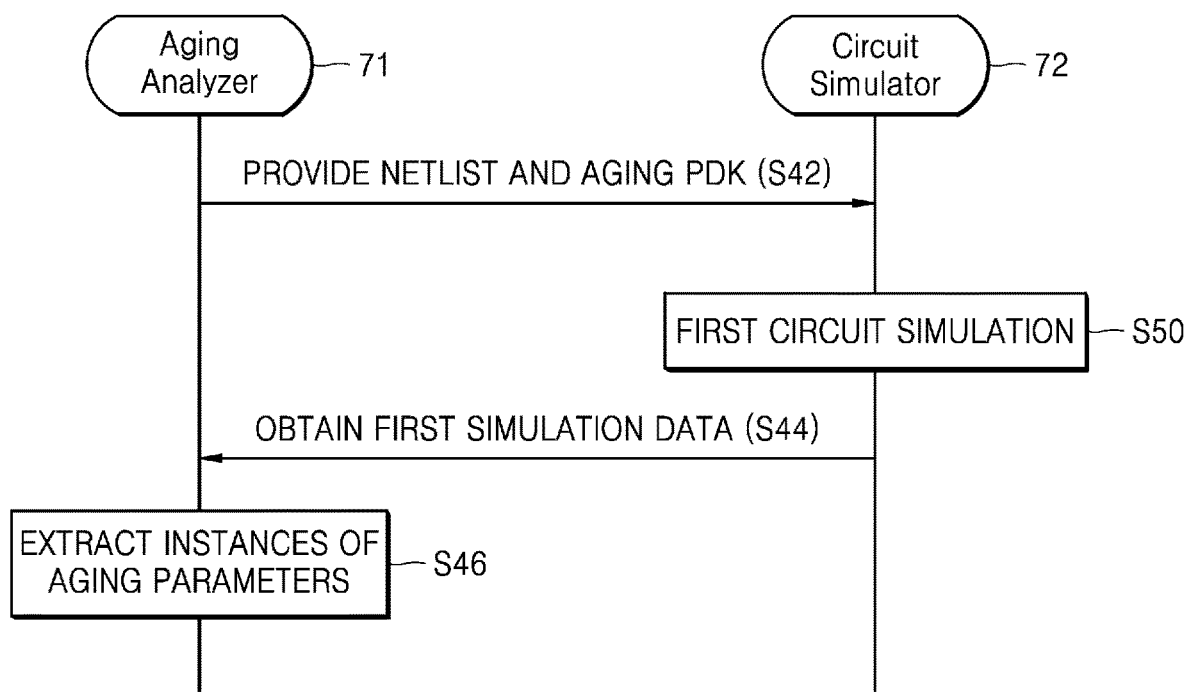
FIG. 7 is a signaling diagram of a method of estimating aging of an IC, according to an example embodiment of the inventive concept.

FIG. 7 is a signaling diagram of a method of estimating aging of an IC, according to an example embodiment of the inventive concept. Particularly, FIG. 7 is an example of operation S40 of FIG. 1. According to some embodiments, operation S40 of FIG. 1 may include operations S42. S44, and S46 of FIG. 7 and may be performed by an aging analyzer 71. According to some embodiments, operation S40 of FIG. 1 may further include operation S50 in addition to operations S42, S44, and S46 of FIG. 7 and may be performed by the aging analyzer 71 and a circuit simulator 72. Hereinafter, FIG. 7 will be described with reference to FIG. 1.

The aging analyzer 71 and the circuit simulator 72 may indicate individual computing systems or indicate software as a program executed by a single computing system. For example, when the aging analyzer 71 and the circuit simulator 72 respectively correspond to individual computing systems, data may be transmitted and received between the aging analyzer 71 and the circuit simulator 72 through a communication channel between the computing systems. Alternatively, when the aging analyzer 71 and the circuit simulator 72 are implemented in a single computing system, data may be transmitted and received between the aging analyzer 71 and the circuit simulator 72 through a storage medium inside the computing system. For example, the data may be transmitted and received between the aging analyzer 71 and the circuit simulator 72 via a bus, as discussed in connection with FIG. 13.

Referring to FIG. 7, in operation S42, the aging analyzer 71 may provide the netlist NET and the aging PDK PDK1 to the circuit simulator 72. For example, the aging analyzer 71 may transmit the netlist NET and the aging PDK PDK1 to the circuit simulator 72 via a communication channel or bus. As described above with reference to FIGS. 1 and 2, the netlist NET may define an IC, and the aging PDK PDK1 may define aging parameters independently to the netlist NET, and the aging parameters may be defined inside a device model.

In operation S50, the circuit simulator 72 may perform the first circuit simulation. The circuit simulator 72 may simulate sub-circuits defined in the netlist NET and quoted sub-circuits with reference to the aging PDK PDK1 and execute a measurement command included in the aging PDK PDK1 in a process of referring to the aging PDK PDK1. Accordingly, the circuit simulator 72 may calculate both electrical stress of device instances and aging parameters and generate first simulation data including values of the aging parameters.

In operation S44, the aging analyzer 71 may obtain the first simulation data from the circuit simulator 72. For example, the circuit simulator 72 may transmit the first simulation data to the aging analyzer 71 via the communication channel or bus. The first simulation data may include the Values of the aging parameters, i.e., instances of the aging parameters.

In operation S46, the aging analyzer 71 may extract the instances A_PAR of the aging parameters. Because the first simulation data may include not only the values of the aging parameters but also various pieces of information generated by simulating an IC, the aging analyzer 71 may extract the values of the aging parameters, i.e., the instances A_PAR of the aging parameters, from the first simulation data. An example of the extracted instances A_PAR of the aging parameters will be described below with reference to FIG. 8.

FIG. 8 illustrates instances of aging parameters, according to an example embodiment of the inventive concept. Particularly, FIG. 8 illustrates the instances of the aging parameters extracted from the first simulation data generated by the first circuit simulation performed based on the aging PDK PDK1' of FIG. 3. As described above with reference to FIGS. 1 and 7, the instances of the aging parameters may indicate aging parameters having values according to the first circuit simulation.

Referring to FIG. 8, an instance A_PAR' of an aging parameter may include a hierarchical address of a device instance, an aging parameter of the device instance, and a value of the aging parameter. For example, in line L21 of the instance A_PAR' of the aging parameter of FIG. 8, "xinv1" indicates a higher sub-circuit of an NFET and "xfet_01" indicates an instance name of the NFET. Accordingly, to which NFET instance the first aging parameter "aging1_nfet" belongs may be specified by a hierarchical address, i.e., "xinv1.xfet_01". As shown in FIG. 8, a value of the first aging parameter "aging1_nfet" of the NFET instance "xfet_01." included in the sub-circuit "xinv_1" may be "0.01". Likewise, in line L22 of the instance A_PAR' of the aging parameter, a value of the second aging parameter "aging2_nfet" of the NFET instance "xfet_01" included in the sub-circuit "xinv1" may be "0.21". As shown in FIG. 8, a value of an aging parameter may be specified by a hierarchical address indicating one of sub-circuits hierarchically connected in the netlist NET, and accordingly, as described below with reference to FIGS. 10 and 11, a simulation of an aged IC, i.e., the second circuit simulation, may be easily performed.

Figure 9:
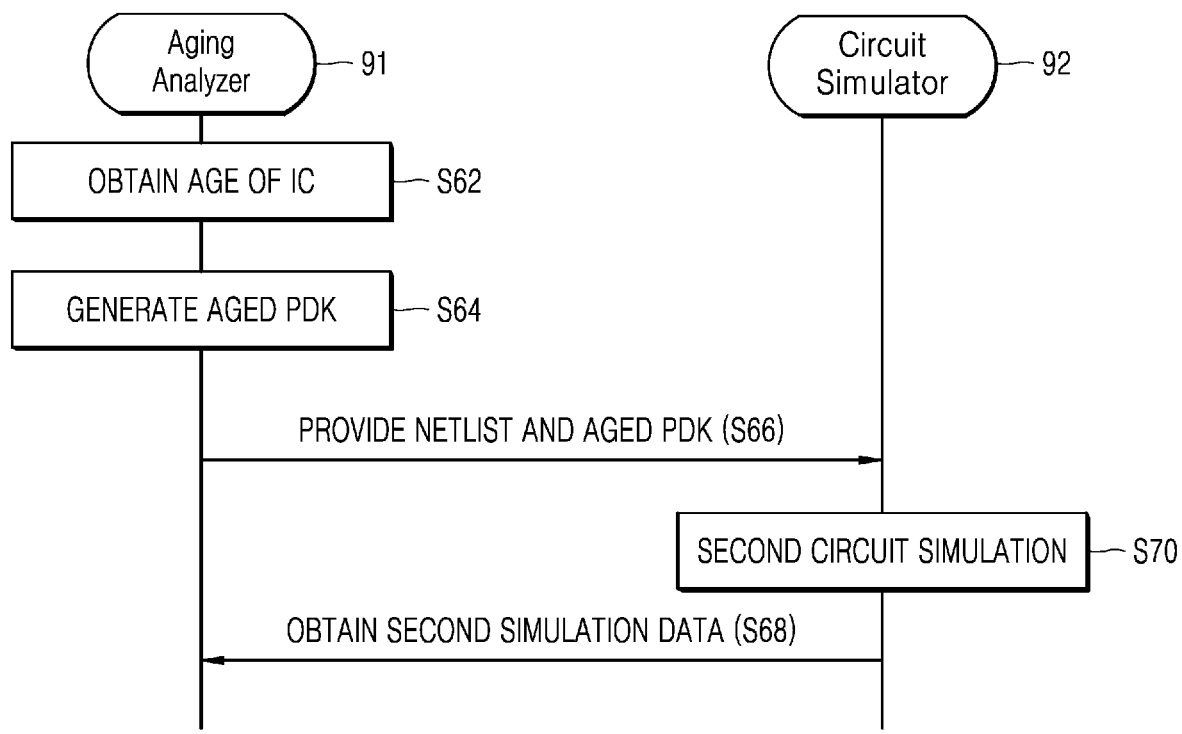
FIG. 9 is a signaling diagram of a method of estimating aging of an IC, according to an example embodiment of the inventive concept.

FIG. 9 is a signaling diagram of a method of estimating aging of an IC, according to an example embodiment of the inventive concept. Particularly, FIG. 9 is an example of operation S60 of FIG. 1. According to some embodiments, operation S60 of FIG. 1 may include operations S62, S64, S66, and S68 of FIG. 9 and may be performed by an aging analyzer 91. According to some embodiments, operation S60 of FIG. 1 may further include operation S70 in addition to operations S62, S64, S66, and S68 of FIG. 9 and may be performed by the aging analyzer 91 and a circuit simulator 92. Hereinafter, FIG. 9 will be described with reference to FIG. 1, and the description made with reference to FIG. 7 will be omitted in the description with reference to FIG. 9.

Referring to FIG. 9, in operation S62, the aging analyzer 91 may obtain the age A_IN of the IC. The aging analyzer 91 may obtain the age A_IN of the IC by an arbitrary scheme. For example, the aging analyzer 91 may obtain the age A_IN of the IC from the user through an input device such as a keyboard, a mouse, or a touchscreen or obtain the age of the IC from a script edited in advance by the user.

In operation S64, the aging analyzer 91 may generate an aged PDK. The aged PDK may include model parameters, i.e., instances of the model parameters, having values to which the age A_IN of the IC, which has been obtained in operation S62, is reflected based on the instances A_PAR of the aging parameters. For example, the aged PDK may include values of model parameters indicating modified characteristics of devices included in the aged IC and may be referred to as a third PDK herein. An example of operation S64 may be described below with reference to FIG. 10.

In operation S66, the aging analyzer 91 may provide the netlist NET and the aged PDK to the circuit simulator 92. For example, the aging analyzer 91 may transmit the netlist NET and the aged PDK to the circuit simulator 92 via a communication channel or bus. The netlist NET may define the IC, and the aged PDK may include model parameters having values to which the age A_IN of the IC is reflected. In addition, according to some embodiments, the PDK may be provided to the circuit simulator 92 together with the netlist NET and the aged PDK.

In operation S70, the circuit simulator 92 may perform the second circuit simulation. The circuit simulator 92 may simulate the device instances included in the netlist NET based on the values of the model parameters included in the aged PDK. Accordingly, the circuit simulator 92 may simulate the IC aged according to the age A_IN of the IC and generate the second simulation data including information indicating an operation of the aged IC. The second simulation data may be referred to as the aging data A_DAT.

In operation S68, the aging analyzer 91 may obtain the second simulation data as the aging data A_DAT from the circuit simulator 92. For example, the circuit simulator 92 may transmit the second simulation data as the aging data A_DAT to the aging analyzer 91 via the communication channel or bus. According to some embodiments, next to operation S68, an operation of evaluation the reliability of the IC based on the aging data A_DAT may be performed. When the evaluated reliability is equal to or higher than a reference value, operations of fabricating an IC by a process may be performed thereafter.

Figure 10:
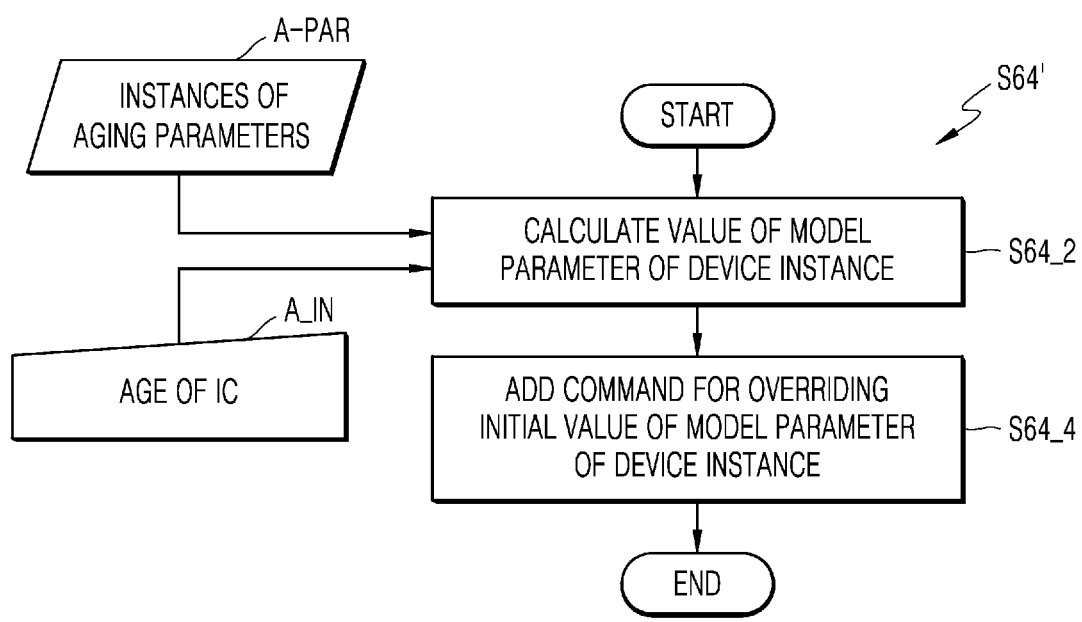
FIG. 10 is a flowchart of a method of estimating aging of an IC, according to an example embodiment of the inventive concept.

FIG. 10 is a flowchart of a method of estimating aging of an IC, according to an example embodiment of the inventive concept. Particularly, the flowchart of FIG. 10 is an example of operation S64 of FIG. 9. As described above with reference to FIG. 9, in operation S64' of FIG. 10, the aged PDK may be generated. As shown in FIG. 10, operation S64' may include operations S64_2 and S64_4, and hereinafter. FIG. 10 will be described with reference to FIG. 9.

In operation S64_2, a value of a model parameter of a device instance may be calculated. As shown in FIG. 10, the value of the model parameter of the device instance may be obtained from the instances A_PAR of the aging parameters, and a value of a model parameter of the device instance may be calculated based on the obtained value of the aging parameter and the age A_IN of the IC. According to some embodiments, the value of the model parameter may be calculated by a function of a value of at least one aging parameter and the age A_IN of the IC. For example, the first aging parameter "aging1_nfet" of an NFET may indicate threshold voltage shift for a unit period of time, and when the unit period of time is 1 year and the age A_IN of the IC is 10 years, a model parameter "delvtrand" of a device instance "xinv1.xfet_01" of FIG. 8 may be "0.1" (0.1=0.01*10). According to some embodiments, the value of the model parameter may be calculated from values of two or more aging parameters.

In operation S64_4, a command for overriding an initial value of the model parameter of the device instance may be added. In the PDK PDK2, a device model may include a model parameter having an initial value without considering aging, and the device instances in the netlist NET may also include model parameters having initial values. In addition, a model parameter of which an initial value is not defined in the PDK PDK2 or the netlist NET may have a default value defined by the BSIM. Accordingly, to override the initial value of the model parameter of the device instance with the value calculated in operation S64_2, a command to be executed by a circuit simulator may be added to generate the aged PDK. Accordingly, the circuit simulator may recognize the value of the model parameter of the device instance as a value provided by the aged PDK in the second circuit simulation, and accordingly, an aged device instance may be simulated. An example of the aged PDK will be described below with reference to FIG. 11.

FIG. 11 illustrates an example of an aged PDK, according to an example embodiment of the inventive concept. As described above with reference to FIG. 9, the aged PDK may include values of model parameters of a device instance, i.e., an instance of the model parameters. In addition, as described above with reference to FIG. 10, the aged PDK may include a command for overriding an initial value of a model parameter.

Referring to FIG. 11, an aged PDK PDK3 may include a command ".defparam" in line L11, and the command ".defparam" may direct a circuit parameter to override a following parameter. For example, the command ".defparam" may indicate that a value of a model parameter "ids0mult" of a device instance "xinv1.xfet_01" in line L11 is overridden with "0.90", indicate that a value of a model parameter "delvtrand" of the device instance "xinv1.fet_01" in line L12 is overridden with "−0.02", and indicate that a value of a model parameter "dtemp" of the device instance "xinv1.xfet_01" in line L13 is overridden with "9.0" The circuit simulator (e.g., circuit simulator 92 of FIG. 9) may perform a simulation based on the netlist NET and the aged PDK PDK3, resulting in generating the aging data A_DAT indicating an operation of the aged IC.

Figure 12:
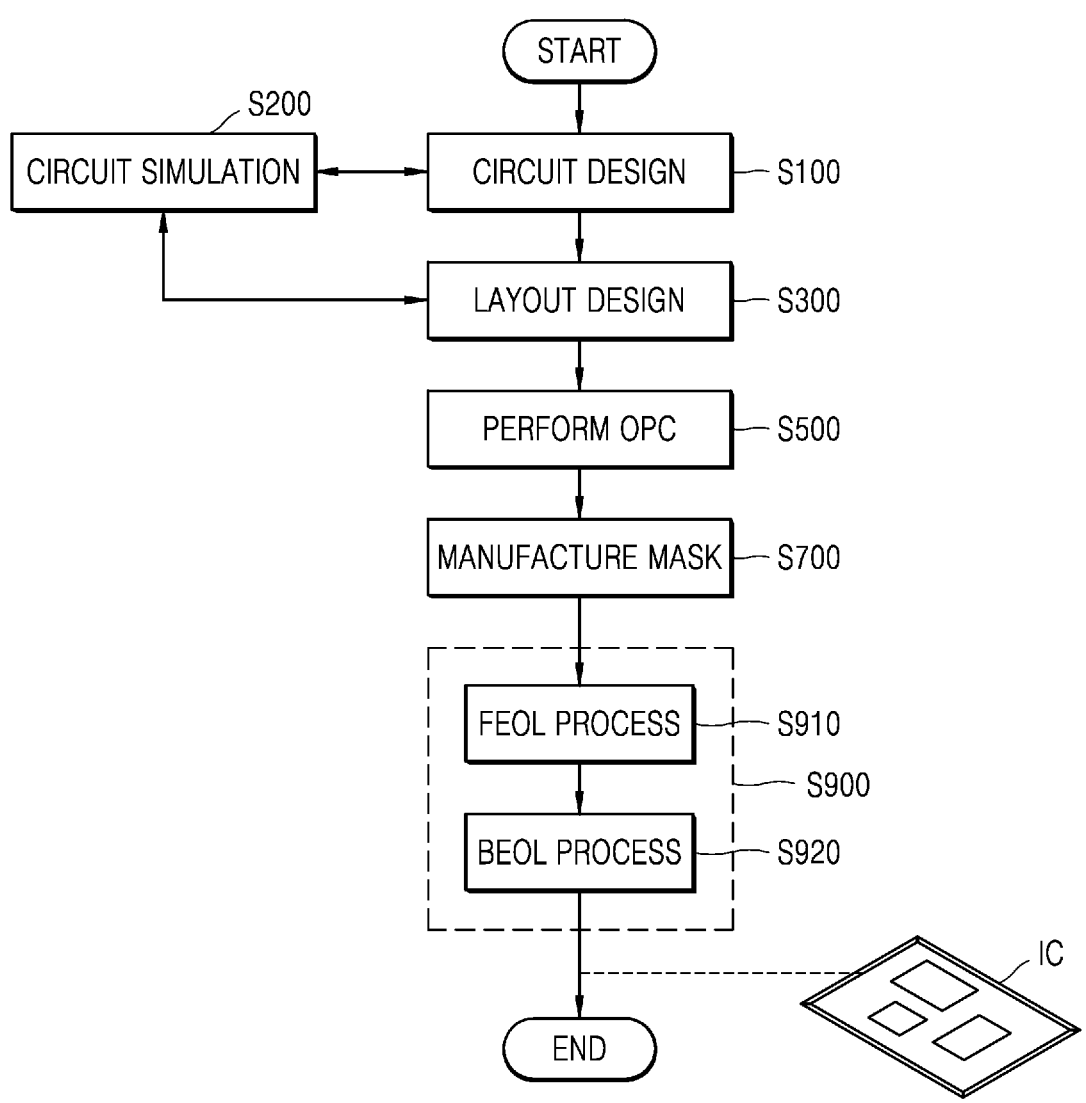
FIG. 12 is a flowchart of a method of fabricating an IC, according to an example embodiment of the inventive concept.

FIG. 12 is a flowchart of a method of fabricating an IC, according to an example embodiment of the inventive concept. As shown in FIG. 12, the method of fabricating an IC may include a plurality of operations S100, S200, S300, S500, S700, and S900.

In operation S100, a circuit design may be performed. For example, to satisfy a target performance, some of various devices (e.g., a transistor and the like) may be selected, and the selected devices may be connected to each other. According to some embodiments, the circuit design may be performed on a circuit design tool for providing a user interface to a designer. As shown in FIG. 3, the circuit design may be performed with reference to a result of a circuit simulation performed in operation S200. For example, to verify the reliability of a designed IC, the first circuit simulation may be performed based on the netlist NET defining an IC and the aging PDK PDK1 as described above with reference to FIG. 7, and the second circuit simulation may be performed based on the netlist NET and the aged PDK PDK3 as described above with reference to FIG. 9. As a result of the simulation, the reliability of the designed IC may be evaluated, and when the reliability is equal to or higher than a reference value, the circuit design may be finished. As a result, an IC having a desired reliability may be easily designed.

In operation S300, a layout design may be performed. For example, a layout of the IC may be designed based on a netlist defining the IC designed in operation S100, and data defining the layout of the IC, i.e., layout data, may be generated. The layout data may include geometric information of patterns included in the IC, and may have a graphic database system information interchange (GDSII) format according to some embodiments. According to some embodiments, the layout design may be performed on a layout design tool. As shown in FIG. 3, the layout design may be performed with reference to a result of the circuit simulation performed in operation S200. For example, the circuit simulation may be performed by considering a parasitic component of a pattern in layout. According to a simulation result, the layout of the IC may be corrected, and a circuit re-design may be performed in operation S100.

In operation S500, optical proximity correction (OPC) may be performed. OPC may include a job for forming a pattern of a desired shape by correcting a distortion phenomenon such as refraction caused by the characteristics of light in photolithography included in a semiconductor process for fabricating an IC, and a pattern on a mask may be determined by applying OPC to the layout data. According to some embodiments, the layout of the IC may be restrictively modified in operation S500, and the restrictive modification of the IC in operation S500 may be referred to as design polishing as post-processing for optimizing a structure of the IC.

In operation S700, a mask may be manufactured. For example, by applying OPC to the layout data, patterns of the mask for forming a plurality of patterns may be defined, and at least one mask (e.g., a photomask) for forming respective patterns of a plurality of layers may be manufactured.

In operation S900, the IC may be fabricated. For example, the IC may be fabricated by patterning the plurality of layers by using the at least one mask manufactured in operation S700. As shown in FIG. 12, operation S900 may include operations S910 and S920.

In operation S910, a front-end-of-line (FEOL) process may be performed. The FEOL process may indicate a process of forming individual devices, e.g., a transistor, a capacitor, a resistor, and the like, on a substrate in a process of fabricating an IC. For example, the FEOL process may include planarizing and cleaning a wafer, forming a trench, forming a well, forming a gate line, forming a source and a drain, and the like.

In operation S920, a back-end-of-line (BEOL) process may be performed. The BEOL process may indicate a process of interconnecting individual devices, e.g., a transistor, a capacitor, a resistor, and the like, in a process of fabricating an IC. For example, the BEOL process may include siliciding gate, source, and drain regions, adding a dielectric, performing planarization, forming a hole, adding a metal layer, forming a via, forming a passivation layer, and the like. Thereafter, the IC may be packaged in a semiconductor package and used as a component for various applications.

Figure 13:
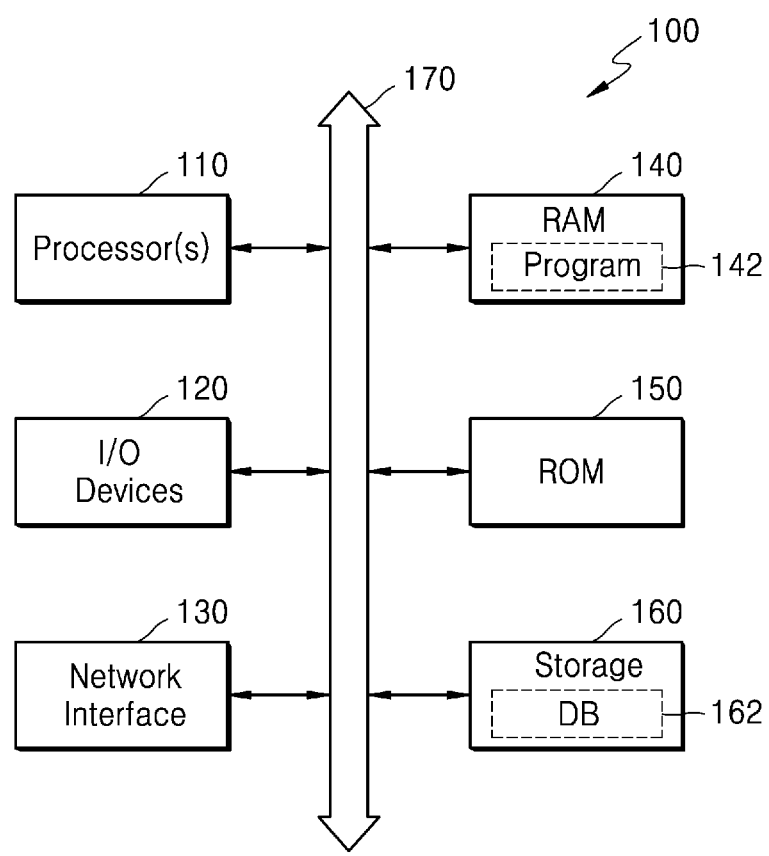
FIG. 13 is a block diagram of a computing system, according to an example embodiment of the inventive concept.

FIG. 13 is a block diagram of a computing system, according to an example embodiment of the inventive concept. At least some of the operations included in the methods of estimating aging of an IC, according to the example embodiments of the inventive concept, may be performed by a computing system 100.

The computing system 100 may be a stationary computing system, such as a desktop computer, a workstation, or a server, or a mobile computing system, such as a laptop. As shown in FIG. 13, the computing system 100 may include at least one processor 110, input/out (I/O) devices 120, a network interface 130, random access memory (RAM) 140, read only memory (ROM) 150, and a storage 160. The at least one processor 110, the I/O devices 120, the network interface 130, the RAM 140, the ROM 150, and the storage 160 may be connected to a bus 170 and communicate with each other through the bus 170.

The at least one processor 110 may be referred to as a processing unit and include at least one core, e.g., a microprocessor, an application processor (AP), a digital signal processor (DSP), or a graphics processing unit (GPU), capable of executing an arbitrary set of instructions (e.g., Intel Architecture-32 (IA-32), 64-bit extended IA-32, x86-64, PowerPC, Sparc, million instructions per second (MIPS), advanced reduced instruction set computer (RISC) machine (ARM), IA-64, or the like). For example, the at least one processor 110 may access a memory, i.e., the RAM 140 or the ROM 150, through the bus 170 and execute instructions stored in the RAM 140 or the ROM 150.

The RAM 140 may store a program 142 for performing a method according to an example embodiment of the inventive concept or at least a portion of the program 142, and the program 142 may allow the at least one processor 110 to perform at least some of the operations included in the method of estimating aging of an IC, according to an example embodiment of the inventive concept. The program 142 may include a plurality of instructions executable by the at least one processor 110, and the plurality of instructions included in the program 142 may allow the at least one processor 110 to perform at least some of the operations included in the above-described method of estimating aging of an IC. According to some embodiments, the program 142 may include at least one of the aging analyzers 71 and 91 and the circuit simulators 72 and 92 of FIGS. 7 and 9.

The storage 160 may not lose stored data even though power supplied to the computing system 100 is cut off. For example, the storage 160 may include a non-volatile memory device such as a flash memory or include a storage medium such as a magnetic tape, an optical disc, or a magnetic disc. In addition, the storage 160 may be portable and may be detachable from the computing system 100. The storage 160 may store the program 142 according to an example embodiment of the inventive concept, and before the program 142 is executed by the at least one processor 110, the program 142 or at least a portion thereof may be loaded from the storage 160 to the RAM 140. Alternatively, the storage 160 may store a file made using a program language, and the program 142 or at least a portion thereof generated by a compiler or the like from the file may be loaded to the RAM 140.

As shown in FIG. 13, the storage 160 may have a database (DB) 162, and the DB 162 may include data required to perform the method of estimating aging of an IC, according to an example embodiment of the inventive concept. For example, the DB 162 may include at least one of the netlist NET and the aging PDK PDK1 of FIG. 1 and include the PDK PDK2 and the aging library A_LIB of FIG. 2. In addition, the DB 162 may store data generated in a process of performing the method of estimating aging of an IC, according to an example embodiment of the inventive concept. For example, the at least one processor 110 may generate data by processing data stored in the storage 160 and store the generated data in the storage 160, according to the program 142. For example, the DB 162 may include at least one the instances A_PAR of the aging parameters and the aging data A_DAT of FIG. 1 and include the aged PDK PDK3 of FIG. 11.

The I/O devices 120 may include input devices such as a keyboard and a pointing device and output devices such as a display and a printer. For example, a user may trigger, through the I/O devices 120, execution of the program 142 by the at least one processor 110, input the age A_IN of an IC, and check the aging data A_DAT.

The network interface 130 may provide an access to a network outside the computing system 100. For example, the network may include a plurality of computing systems and communication links, and the communication links may include wired links, optical links, wireless links, or arbitrary other types of links. When at least some of the operations included in the method of estimating aging of an IC, according to an example embodiment of the inventive concept, are performed by another computing system communicably connected through the network interface 130, data may be transmitted and received through the network interface 130.

Figure 14:
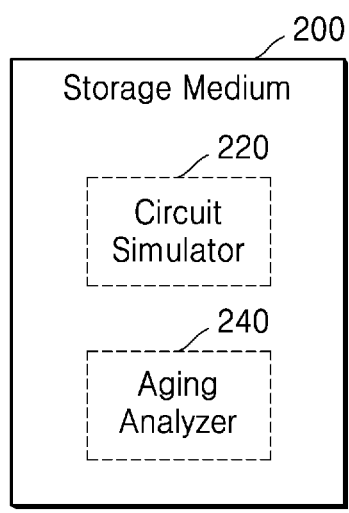
FIG. 14 is a block diagram of a storage medium, according to an example embodiment of the inventive concept.

FIG. 14 is a block diagram of a storage medium 200, according to an example embodiment of the inventive concept. The storage medium 200 may non-transitorily store information and may be accessed by a computer. In addition, the storage medium 200 may store information in non-volatile manner and may include, as a non-limiting example, a non-volatile memory or a medium such as a magneto-optic disc or a magnetic disc. In addition, the storage medium 200 may be portable and provide stored information to a computing system (e.g., computing system 100 of FIG. 13) by being accessed to the computing system.

As shown in FIG. 14, the storage medium 200 may store a circuit simulator 220 and an aging analyzer 240. According to some embodiments, unlike that shown in FIG. 14, the storage medium 200 may include only the aging analyzer 240. The storage medium 200 may be accessed from a processor or a computing system, and the processor or the computing system may perform at least some of the operations included in the method of estimating aging of an IC, according to an example embodiment of the inventive concept, by executing the circuit simulator 220 and/or the aging analyzer 240 stored in the storage medium 200. In some embodiments, the circuit simulator 220 and the aging analyzer 240 of FIG. 14 may correspond to the circuit simulator 72 and the aging analyzer 71 of FIG. 7 and the circuit simulator 92 and the aging analyzer 91 of FIG. 9.

While the inventive concept has been particularly shown and described with reference to embodiments thereof, it will be understood that various changes in form and details may be made therein without departing from the spirit and scope of the following claims.

What is claimed is:

1. A system for estimating aging of an integrated circuit (IC), the system comprising:
  at least one processor; and
  a computer-readable non-transitory storage medium which stores instructions executable by the at least one processor,
  wherein the at least one processor is configured to access the computer-readable non-transitory storage medium and, when executing the instructions, to perform operations comprising:
    obtaining a first process design kit (PDK) comprising a plurality of first device models corresponding to a plurality of devices provided by a process of fabricating the IC;
    performing a first circuit simulation based on a netlist and the first PDK to obtain values of aging parameters of device instances included in the netlist defining the IC; and
    performing a second circuit simulation based on the values of the aging parameter and the netlist to obtain aging data of the IC, and wherein each of the plurality of first device models comprises at least one measurement command to be executed in the first circuit simulation to calculate an aging parameter of the IC.

2. The system of claim 1, wherein the obtaining of the first PDK comprises:
   obtaining a second PDK comprising a plurality of second device models respectively comprising model parameters defining operational characteristics of the plurality of devices;
   obtaining an aging library comprising a plurality of measurement commands corresponding to the plurality of devices; and
   generating the first PDK by adding at least one measurement command to each of the plurality of second device models based on the second PDK and the aging library.

3. The system of claim 1, wherein the obtaining of the values of the aging parameters comprises:
   providing the netlist and the first PDK to a circuit simulator;
   obtaining first simulation data from the circuit simulator; and
   extracting instances of the aging parameters from the first simulation data.

4. The system of claim 3,
   wherein the netlist comprises a plurality of sub-circuits hierarchically connected, and
   wherein each of the instances of the aging parameters comprises a hierarchical address of a device instance, an aging parameter of the device instance, and a value of the aging parameter.

5. The system of claim 1, wherein the obtaining of the aging data comprises:
   obtaining an age of the IC;
   generating a third PDK of updating a value of at least one of model parameters of the device instances based on the values of the aging parameters and the age;
   providing the netlist and the third PDK to a circuit simulator; and
   obtaining second simulation data as the aging data from the circuit simulator.

6. The system of claim 5, wherein the generating of the third PDK comprises:
   calculating an aged value of a model parameter of a device instance based on the values of the aging parameters and the age; and
   adding a command for overriding an initial value of the model parameter of the device instance with the aged value.

7. A method of estimating aging of an integrated circuit (IC), the method comprising:
   obtaining a first process design kit (PDK) comprising a plurality of first device models corresponding to a plurality of devices provided by a process of fabricating the IC;
   performing a first circuit simulation based on a netlist and the first PDK to obtain values of aging parameters of device instances included in the netlist defining the IC; and
   performing a second circuit simulation based on the values of the aging the netlist to obtain aging data of the IC,
   wherein each of the plurality of first device models comprises at least one measurement command to be executed in the first circuit simulation to calculate an aging parameter of the IC.

8. The method of claim 7, wherein the obtaining of the first PDK comprises:
   obtaining a second PDK comprising a plurality of second device models respectively comprising model parameters defining operational characteristics of the plurality of devices;
   obtaining an aging library comprising a plurality of measurement commands corresponding to the plurality of devices; and
   generating the first PDK by adding at least one measurement command to each of the plurality of second device models based on the second PDK and the aging library.

9. The method of claim 8, wherein the generating of the first PDK comprises:
   inserting, into a second device model, a path to access the aging library and an index of a part of the aging library, the index corresponding to the second device model.

10. The method of claim 8,
    wherein the aging library comprises at least one process dependent variable, and
    wherein the generating of the first PDK comprises adding, before the added at least one measurement command, a part of configuring a value of the at least one process dependent variable.

11. The method of claim 7, wherein the at least one measurement command directs measurement of a result of an aging function which comprises, as at least one argument, a voltage and/or a current measured from a first device model and defines an aging parameter.

12. The method of claim 11, wherein the aging function includes a continuous function supported by a plurality of circuit simulators.

13. The method of claim 7, wherein the obtaining of the values of the aging parameters comprises:
    providing the netlist and the first PDK to a circuit simulator;
    obtaining first simulation data from the circuit simulator; and
    extracting instances of the aging parameters from the first simulation data.

14. The method of claim 13,
    wherein the netlist comprises a plurality of sub-circuits hierarchically connected, and
    wherein each of the instances of the aging parameters comprises a hierarchical address of a device instance, an aging parameter of the device instance, and a value of the aging parameter.

15. The method of claim 7, wherein the obtaining of the aging data comprises:
    obtaining an age of the IC;
    generating a third PDK of updating a value of at least one of model parameters of the device instances based on the values of the aging parameters and the age;
    providing the netlist and the third PDK to a circuit simulator; and
    obtaining second simulation data as the aging data from the circuit simulator.

16. The method of claim 15, wherein the generating of the third PDK comprises:
    calculating an aged value of a model parameter of a device instance based on the values of the aging parameters and the age; and
    adding a command for overriding an initial value of the model parameter of the device instance with the aged value.

17. The method of claim 7, further comprising:
evaluating a reliability of the IC based on the aging data; and
fabricating the IC by the process when the reliability is equal to or higher than a reference value.

18. A method of estimating aging of an integrated circuit (IC), the method comprising:
obtaining a first process design kit (PDK) comprising a plurality of first device models corresponding to a plurality of devices provided by a process of fabricating the IC; and
performing a first circuit simulation based on a netlist and the first PDK to obtain values of aging parameters of device instances included in the netlist defining the IC,
wherein the obtaining of the first PDK comprises:
obtaining a second PDK comprising a plurality of second device models comprising model parameters defining operational characteristics of the plurality of devices, respectively;
obtaining an aging library comprising a plurality of measurement commands to calculate the aging parameters, the plurality of measurement commands being executed in the first circuit simulation and correspond to the plurality of devices; and
generating the first PDK by adding at least one measurement command to each of the plurality of second device models based on the second PDK and the aging library.

19. The method of claim 18, wherein the at least one measurement command directs measurement of a result of an aging function which comprises, as at least one argument, a voltage and/or a current measured from a first device model and defines an aging parameter.

20. The method of claim 19, wherein the aging function includes a continuous function supported by a plurality of circuit simulators.

* * * * *